United States Patent
Jhang et al.

(10) Patent No.: US 11,222,020 B2
(45) Date of Patent: Jan. 11, 2022

(54) DEDUPLICATED DATA TRANSMISSION

(71) Applicant: International Business Machines Corporation, Armonk, NY (US)

(72) Inventors: Jia-Sian Jhang, New Taipei (TW); Hsiao-Yung Chen, New Taipei (TW); Shr-an Su, Taipei (TW); Pao-Chuan Liao, Taipei (TW); Yung Wen YW Deng, Jhongli (TW)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/546,336

(22) Filed: Aug. 21, 2019

(65) Prior Publication Data

US 2021/0056109 A1 Feb. 25, 2021

(51) Int. Cl.
*G06F 16/00* (2019.01)
*G06F 16/2455* (2019.01)
*G06F 16/215* (2019.01)
*G06F 16/174* (2019.01)

(52) U.S. Cl.
CPC .... *G06F 16/24556* (2019.01); *G06F 16/1756* (2019.01); *G06F 16/215* (2019.01)

(58) Field of Classification Search
CPC ............ G06F 16/24556; G06F 16/215; G06F 16/1756
See application file for complete search history.

(56) References Cited

U.S. PATENT DOCUMENTS

| | | | |
|---|---|---|---|
| 8,224,964 B1 | 7/2012 | Fredrickson | |
| 9,253,278 B2 | 2/2016 | Hayton | |
| 2004/0205046 A1* | 10/2004 | Cohen | G06F 16/316 |
| 2004/0249682 A1* | 12/2004 | DeMarcken | G06Q 10/02 |
| | | | 705/5 |
| 2006/0195660 A1 | 8/2006 | Sundarrajan | |
| 2007/0094042 A1* | 4/2007 | Ramer | G06Q 30/0201 |
| | | | 705/1.1 |
| 2007/0260591 A1* | 11/2007 | Ahi | G06Q 10/109 |

(Continued)

OTHER PUBLICATIONS

Alhamad et al., "Light Weight HTTP for Transport and Content Sharing in 5G Cellular Networks", 978-1-4799-6940 © 2014 IEEE, <https://ieeexplore.ieee.org/abstract/document/7029359>, pp. 46-50.

(Continued)

*Primary Examiner* — Syed H Hasan
(74) *Attorney, Agent, or Firm* — Gilbert Harmon, Jr.

(57) ABSTRACT

Embodiments of the present invention relate to a method, system and computer program product for compacting data in a distributed storage system. According to the method, a query request is received from a client, wherein the query request comprises information of a previous query request of the client. A first query result of the query request and a second query result of the previous query request are retrieved. A delta data and a first indicator are sent to the client in response to the first query result being different from the second query result, wherein the delta data is the data of the first query result excluding the data comprised in both first and second query results, and the first indicator indicates the data comprised in both the first and the second query results.

20 Claims, 12 Drawing Sheets

(56) References Cited

U.S. PATENT DOCUMENTS

| | | | |
|---|---|---|---|
| 2010/0318538 A1* | 12/2010 | Wyman | G06F 16/3349 |
| | | | 707/759 |
| 2011/0055190 A1* | 3/2011 | Alexander | G06F 16/9566 |
| | | | 707/706 |
| 2015/0186366 A1* | 7/2015 | Yan | G06F 16/248 |
| | | | 707/741 |
| 2016/0034150 A1* | 2/2016 | Behr | G06F 3/04815 |
| | | | 715/771 |
| 2016/0070705 A1* | 3/2016 | Chevalier | G06F 16/24578 |
| | | | 707/728 |
| 2016/0241667 A1 | 8/2016 | Kulkarni | |
| 2017/0091816 A1* | 3/2017 | Moreau | G06Q 30/0277 |
| 2018/0039703 A1* | 2/2018 | Hasegawa | G06F 16/248 |
| 2019/0278820 A1* | 9/2019 | Hasegawa | G06F 16/2428 |
| 2021/0042320 A1* | 2/2021 | Testardi | G06F 3/0659 |

OTHER PUBLICATIONS

Grigorik, Ilya, "HTTP Caching", Google Developers, Web Fundamentals, <https://ibm.anaqua.com/anaqua/Patent/PatentRelatedArt.aspx?RecordId=95334626>, Jul. 24, 19, 10 pages.

Mell et al., "The NIST Definition of Cloud Computing", NIST, National Institute of Standards and Commerce, Special Publication 800-145, Sep. 2011, 7 pages.

"HTTP ETag", Wikipedia, last edited on Feb. 19, 2021, 3 pages, <https://en.wikipedia.org/wiki/HTTP_ETag>.

\* cited by examiner

Brand
☐ Ap
☐ mo
☐ Otte
☐ PREM

Price

Under $50
$50 to $100
$100 to $150
$150 to $250
$250 to $400
$400 to $600
$600 & Above

[ $ 2000 ] [ $ 3000 ] [ Go ]

Cell Phone Operating System
☐ iOS
☐ Android

Cell Phone Camera Resolution
☐ Up to 2.9 MP
☐ 3 to 4.9 MP
☐ 5 to 7.9 MP
☐ 8 to 12.9 MP
☐ 13 to 19.9 MP
☐ 20 MP & above

Brand

☐ Ap
☐ mo
☐ Otte
☐ PREM

Price

Under $50
$50 to $100
$100 to $150
$150 to $250
$250 to $400
$400 to $600
$600 & Above

[ $ 2000 ] [ $ 3000 ] [ Go ]

Cell Phone Operating System

☐ iOS
☐ Android

Cell Phone Camera Resolution

☐ Up to 2.9 MP
☐ 3 to 4.9 MP
☐ 5 to 7.9 MP
☐ 8 to 12.9 MP
☐ 13 to 19.9 MP
☐ 20 MP & above

FIG. 10C

▼ Request Headers
⚠ Provisional headers are shown
If-Modified-Since: Mon, 12 Nov 2018 20:01:25 GMT 1002 → If-None-Match: "79b3053156d2f74af07518c12d03941d"

FIG. 10D

1004 x Headers   Preview   Response   Timing
▼ General
  Request URL: http://example.com/rest/goods/query?keyword=phone&price_between=200,2500&page=10
  Request Method: GET
  Status Code: ● 304
  Remote Address: 151.101.189.67:443
  Referrer Policy: no-referrer-when-downgrade
▶ Response Headers
  age: 48
  cache-control: max-age=60
  date: Fri, 03 May 2019 05:48:23 GMT
1003 → etag: c855e8eb3fbda1ddfa15bc848b663c44
  status: 304
  vary: origin,accept-encoding, Accept-Encoding
  via: 1.1 varnish
  x-cache: MISS
  x-cache-hits: 0
  x-served-by: cache-pao17456-PAO
  x-timer: S1556862504.967338,VS0,VE64

FIG. 10E though this disclosure includes a detailed description on cloud computing, implementation of the teachings recited herein are not limited to a cloud computing environment. Rather, embodiments of the present invention are capable of being implemented in conjunction with any other type of computing environment now known or later developed.

DEDUPLICATED DATA TRANSMISSION

BACKGROUND

The present invention relates generally to data transmission, and more specifically, to deduplicated data transmission.

With the rapid development of the Internet, the Internet is increasingly relied on for information on a variety of subjects. When a topic is searched or search results are sorted, the caching mechanisms are typically bypassed, resulting in duplicated transmissions of similar data. This duplication of transmitted data accounts for a large amount of the Internet's available bandwidth.

SUMMARY

According to one embodiment of the present invention, there is provided a computer-implemented method. According to the method, a query request is received from a client, wherein the query request comprises information of a previous query request of the client. Then a first query result of the query request and a second query result of the previous query request are retrieved. A delta data and a first indicator are sent to the client in response to the first query result being different from the second query result, wherein the delta data is the data of the first query result excluding the data comprised in both first and second query results, and the first indicator indicates the data comprised in both the first and the second query results.

Further, computer program products and systems are also provided according to embodiments of the present invention.

These and other features and advantages of the present invention will be described in or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5B depicts an example of response header data of an HTTP response sent by a server to a client, according to an embodiment of the present invention.

FIG. 5C depicts an example of request header data of an HTTP Response sent by a server to a client, according to an embodiment of the present invention.

FIG. 10A depicts an example of a query interface, according to an embodiment of the present invention.

FIG. 10B depicts an example of a HTTP Response sent by a server to a client, according to an embodiment of the present invention.

FIG. 10C depicts an example of a query interface, according to an embodiment of the present invention.

FIG. 10D depicts an example of a HTTP Request sent by a client to a server, according to an embodiment of the present invention.

FIG. 10E depicts an example of a HTTP Response sent by a server to a client, according to an embodiment of the present invention.

Throughout the drawings, the same or similar reference numerals represent the same or similar elements.

DETAILED DESCRIPTION

Figure 1:
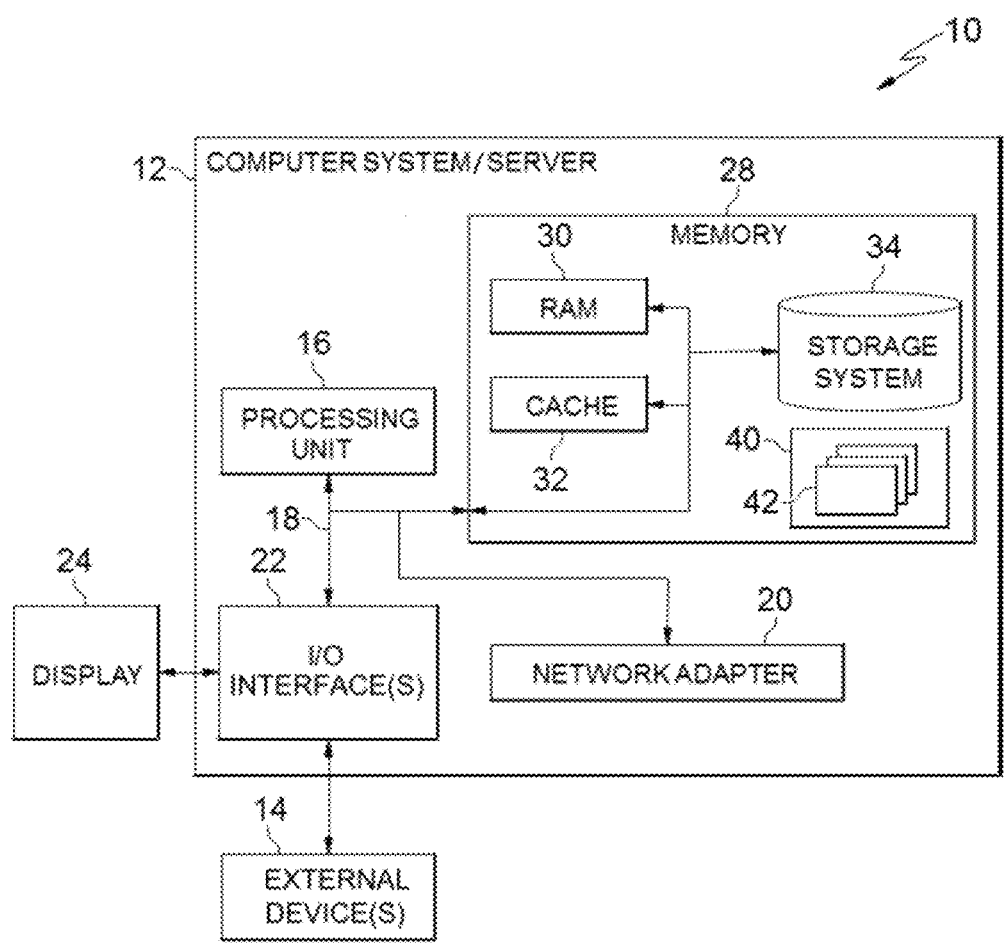
FIG. 1 depicts a cloud computing node, according to an embodiment of the present invention.

Some embodiments will be described in more detail with reference to the accompanying drawings in which the embodiments have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
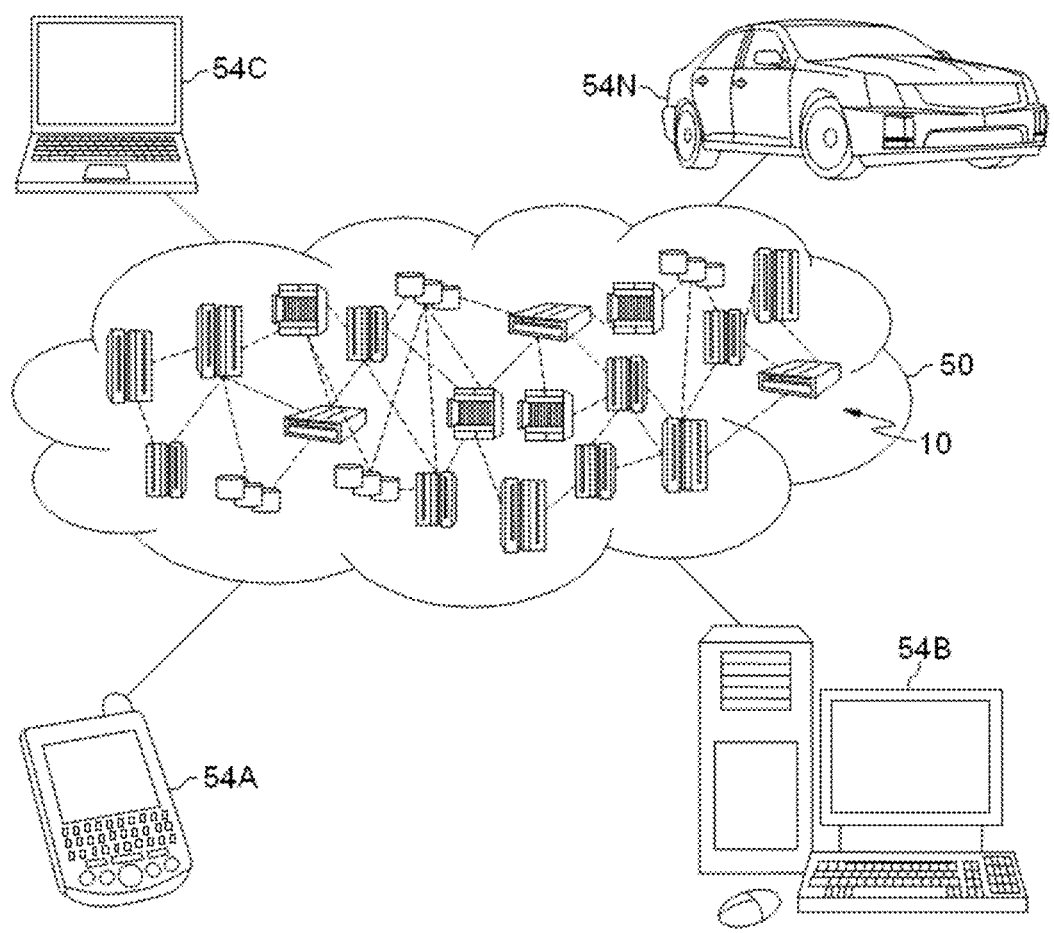
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
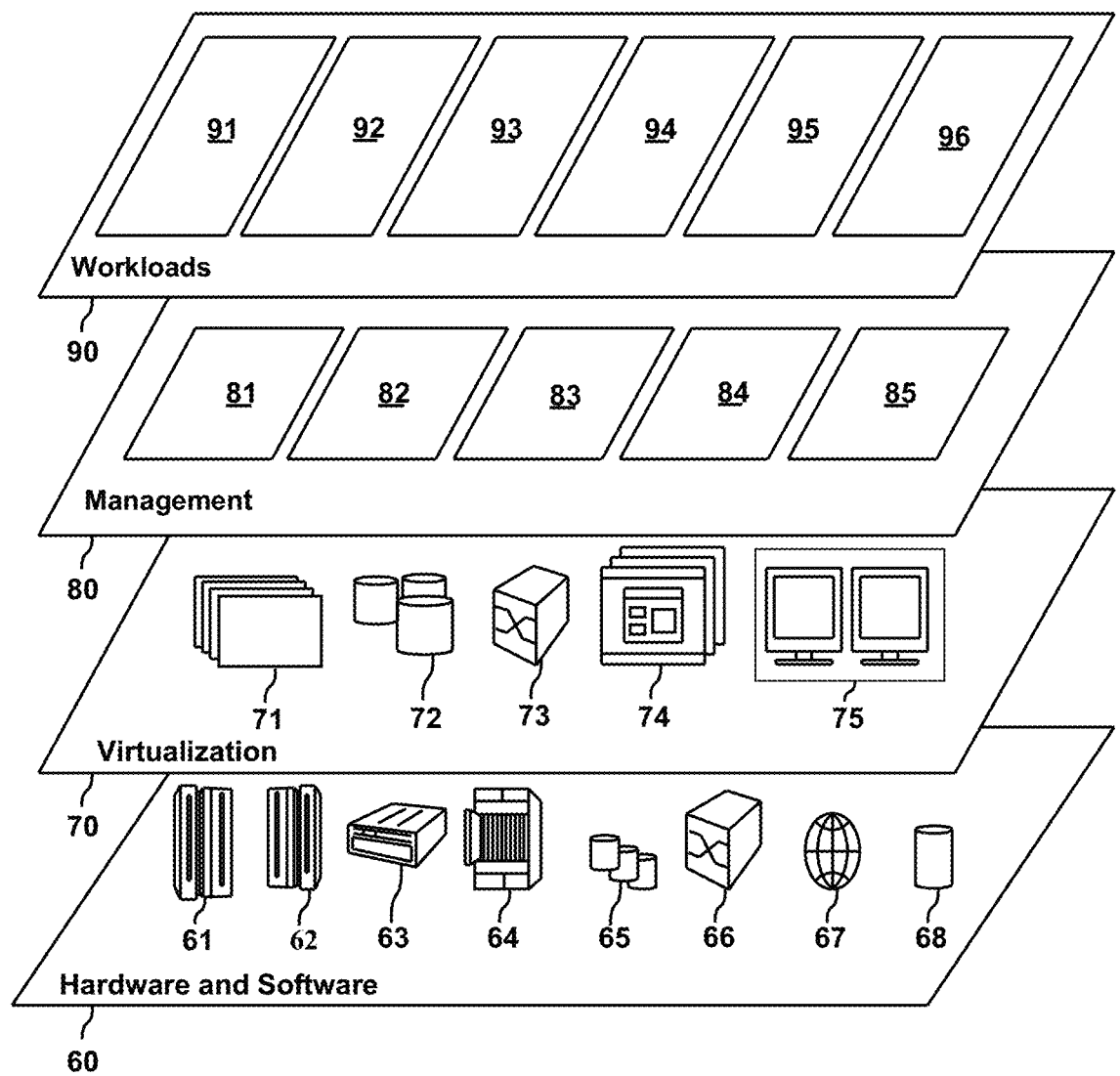
FIG. 3 depicts cloud abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data de-duplication processing 96.

It is well known that the HTTP cache plays an important role in Internet bandwidth efficiency. The HTTP cache mechanism between a client and a server includes headers such as, but not limited to, Expires, Cache-Control, Last-Modified. Despite such time-to-live methodology, embodiments of the present invention describe HTTP entity tags (Etag) allowing the HTTP cache to be more efficient and to save bandwidth, based on the premise that a web server does not need to send a full response if the query results of two queries have not changed. The query results of the two queries can be determined to be the same if the Etags of a current request and a previous request are the same. It should be noted that an Etag is an opaque identifier assigned by a web server to a specific version of a resource found at a URI (Universal Resource Identifier).

Figures 4, 5A:
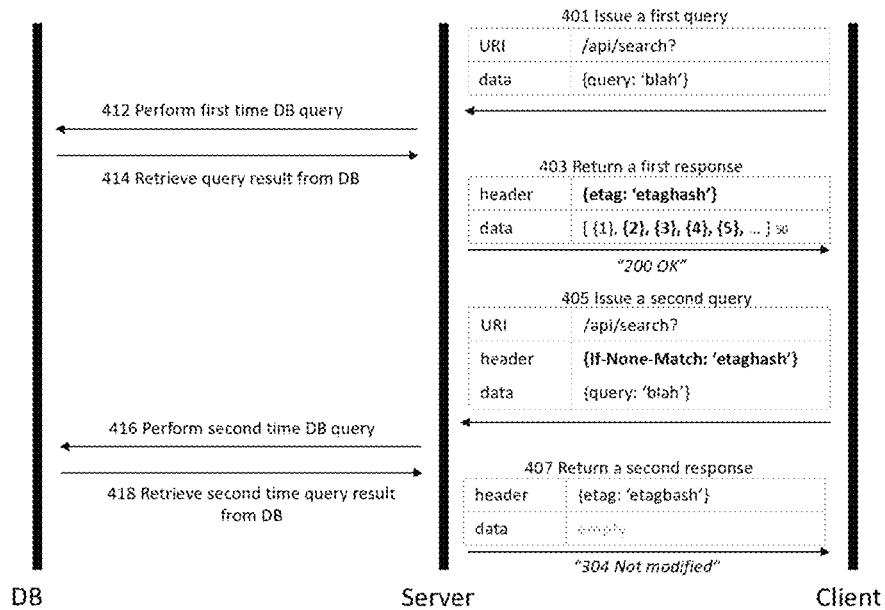
FIG. 4 depicts a communication diagram of a method for performing queries with a query result from a previous query, according to an embodiment of the present invention.
FIG. 5A depicts an example of a query interface, according to an embodiment of the present invention.

Now with reference to FIG. 4, which shows a flowchart of a method for performing a query according to an embodiment of the present invention. As shown in FIG. 4, a client application can issue (401) a query request for searching with query data "blah", and can send the request together with a corresponding URI, for example, "/api/search?," to a server as a first query. Next, after performing the query (412) on a database (DB), the server can retrieve (414) a query result from the DB. Next, the server can return (403) the query result to the client. In addition to the query result, the server can return a calculated Etag value, for example, a hashed value representing the query result, to the client along with the query result. It should be understood that the Etag value can be any other data as long as the data could uniquely represent the query result.

For example, the Etag value "etagbash" can be placed in a HTTP response header, as shown in FIG. 4. In another example, the Etag value can be placed in cookies, or any other suitable place. In a further example, the client can cache the query result and its Etag value after receiving them. In some examples, the client can render the query result on the user's browser. In a further example, the client can issue a new query, i.e. a second query, to retrieve resources using the same URI and the same query data "blah" again. In some examples, it can first be determined whether the local cached resource of the URI having the same parameters is expired (through the Cache-Control and the Expire headers). If the local cached resource is not expired, the local cached resource can be retrieved. If the local cached resource is expired, then the client can contact the server and can send (405) its previously saved copy of the Etag value along with the new query request, i.e. the second query request. In some examples, in the second query request, the previously saved Etag value can be put in "If-None-Match" field of the Headers. Upon receiving the second query request, the server can query (416) the DB again and can retrieve (418) a new query result from the DB. Next, the Etag value of the second query can be determined and if the Etag value of the second query and the Etag value sent by the client are the same then the result of the second query is the same as the result of the first query and the result of the second query does not need to be sent again to the client, only information indicating the result is the same. For example, "304 Not modified" can be sent by the server to the client without the actual data of the query result.

Figures 5B, 5C:
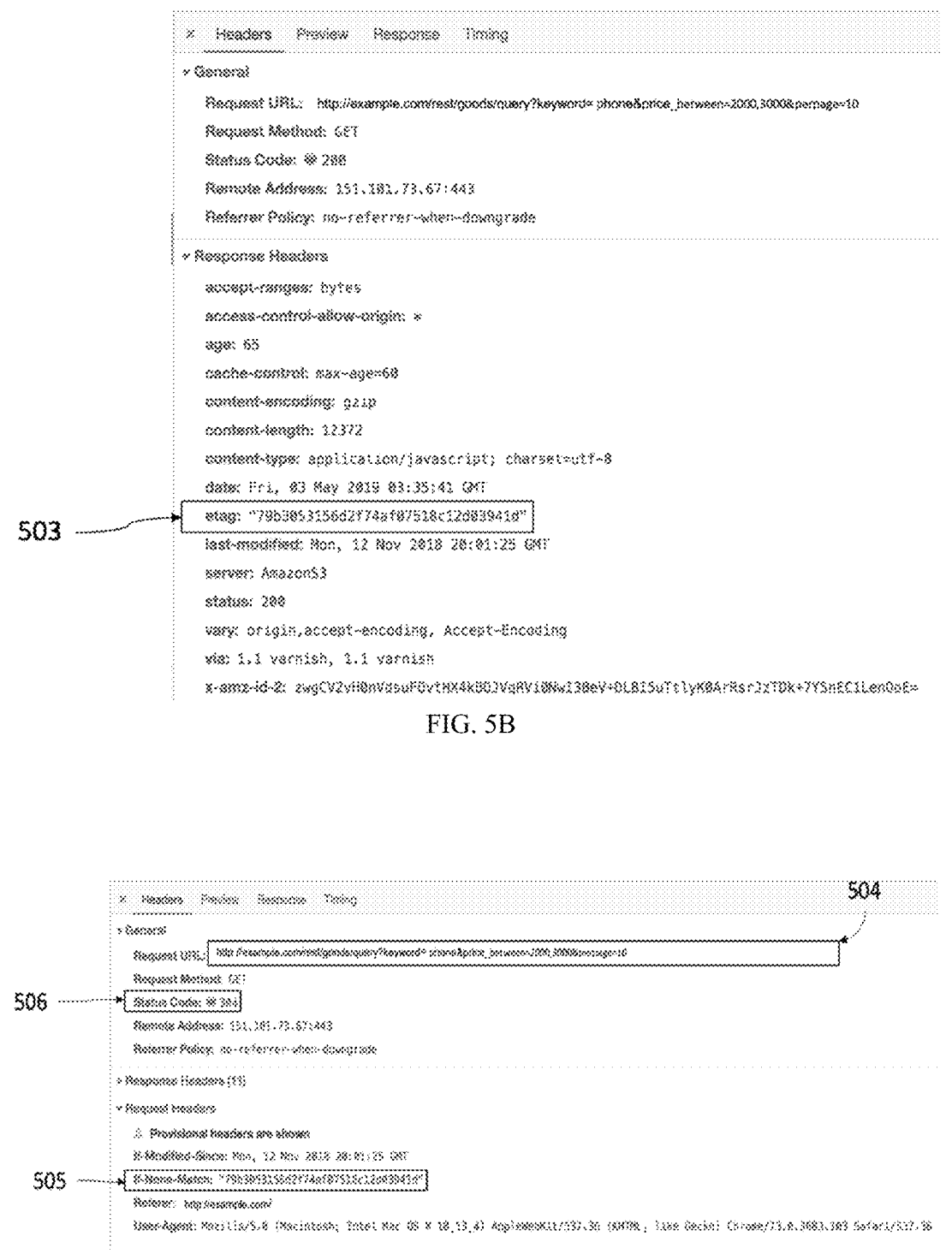

Turning now to FIGS. 5A-5C, illustrated is an example of a query result with matched Etag values.

Looking to FIG. 5A, the URI of the first query request is "http://example.com/rest/goods/query?keyword=phone&price_between=2000,3000& per-page=10" (not shown) wherein the search scope values $2000 (501) and $3000 (502) are input. In response to a "Go" button selection being detected, a first query request is sent to the server. Next, the server can query the DB and receive a query result from the DB and an Etag value can be generated based on the query result. In some examples, the Etag value can be a hash value corresponding to the query result. Regardless of the composition of the Etag, the server can send the query result to the client. In some examples, an HTTP Response, as shown in FIG. 5B, can be sent to the client. Accordingly, an Etag value of "79b3053156d2f74af07518c12d03941d" (503) can be placed in the Header and sent to the client with the query result. As such, the first query is completed.

Continuing the example, the user can submit a second query request. In the second query request, the request URI remains "http://example.com/rest/goods/query?keyword=phone&price_between=2000,3000& per-page=10" (504) and the search scope values remain $2000 and $3000, as in the first query. In response to the "Go" button being selected, the Etag value of the first query request can be sent to the server with the second query request, and a second query is performed. In some examples, the Etag value of the first query request can be placed in the "If-None-Match" field. After the second query request is performed, the Etag value of the second query request can be generated. The Etag value of the second query request "79b3053156d2f74af07518c12d03941d" (505) is the same as the Etag value of the first query request because the query results of the two queries are the same. In some examples, as shown in FIG. 5C, the "status code:304" (506) in the Headers of an HTTP response means "Not modified," i.e. the query results are the same. Accordingly, the contents of the second query result do not need to be sent again because the query results of the two queries have not changed.

However, in some situations, this caching mechanism does not work well. For example, an ETag solution works well when a user browses a website with static content, i.e., content in which query results will not change. However, when a user searches a product or sorts a list by price in an on-line shopping website, wherein the displayed items are not exactly the same, the cache is not applicable because an Etag of the current query request and an Etag of the previous query request are different based on minor differences between the two search results.

Figure 6:
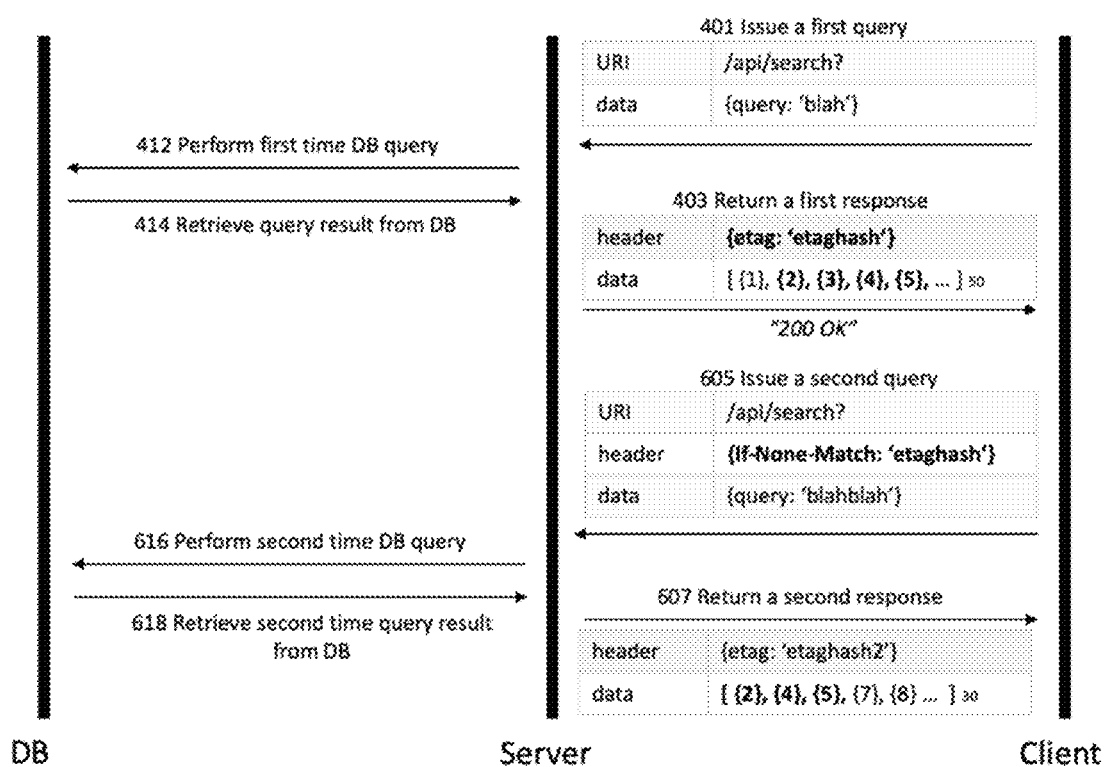
FIG. 6 depicts a communication diagram of a method for processing queries with a different query result, according to an embodiment of the present invention.

Now with reference to FIG. 6, described is an example of processing similar queries with different query results. It should be noted that steps 401, 403, 412 and 414 are the same as in FIG. 4 and the details regarding these steps are not repeated in describing FIG. 6. After receiving (403) the first response from the server, the URI of the first query "/api/search?" and the Etag value "etaghash" are received by the client. Subsequently, the user submits a new query (a second query) with the same URI but different query data "blahblah." The client sends (605) the second query request with a previously saved copy of the Etag value "etaghash" of the first query request to the server. In some examples, as shown in FIG. 6, the previously saved Etag value is placed in the "If-None-Match" field of the headers of the second query request. Then after receiving the second query request, the server performs a second query (616) to the database and retrieves (618) a second query result from DB. The Etag value of the second query request is generated accordingly. It should be noted the second query result is different from the first query result. Accordingly, the Etag value of the second query request is different from the Etag value of the first query request, but most of the data of the two query results are the same with only minor differences of the two query results. In the example shown in FIG. 6, the Etag value of the second query request is "etaghash2," and the Etag value of the first query result is "etaghash." In some examples, it is assumed that the results of the first query and the second query are as follows: the first query result: [item1, item2, item3, item4, item5, item6, item7, item8, item9, item10]; and the second query result: [item2, item4, item5, item7, item8, item11, item12, item13, item14, item15].

Because the two Etag values are different, the whole query result of the second request would be sent (607) to the client along with the new Etag value of the second query. However, there is only minor difference between the first query result and the second query result. In this situation, a more efficient method is expected.

To address the huge waste of bandwidth and unnecessary traffic transactions in modern websites, a deduplicated query processing is proposed.

Figure 7:
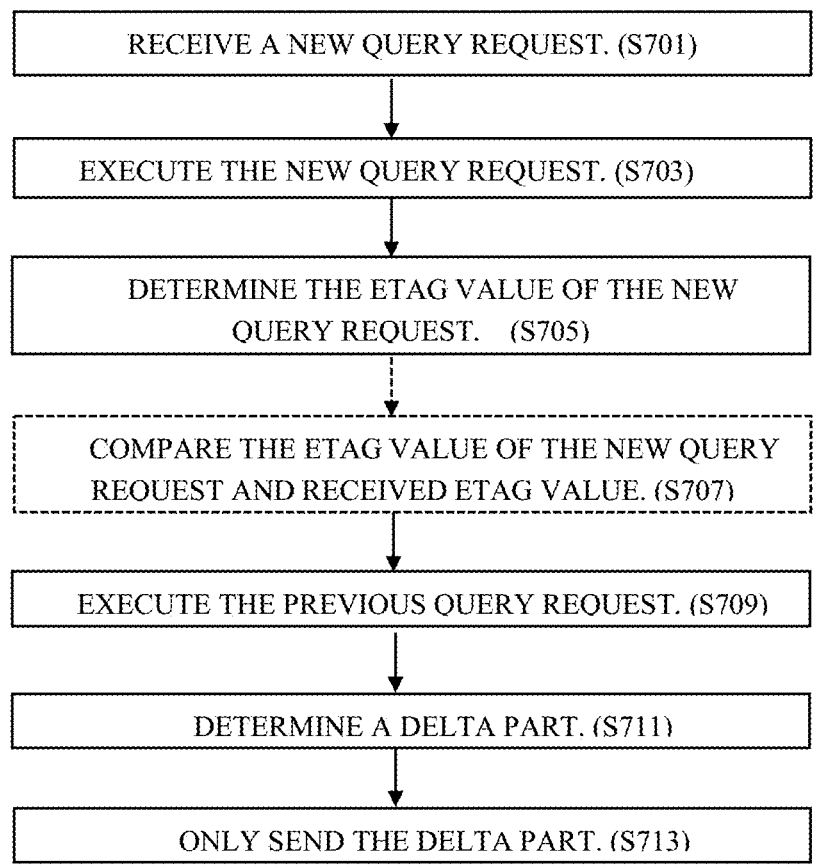
FIG. 7 depicts a flowchart of a method for processing a new query, according to an embodiment of the present disclosure.

Now with reference to FIG. 7, described is a flowchart of a method 700 for processing a query according to an embodiment of the present disclosure. The method 700 starts at step S701, in which a new query request can be received from a client. In one embodiment, the URI associated with the new query request is "http://9.191.83.152/rest/goods/query?keyword=phone&price_between=2000,2500& per-_page=10." It should be noted that the new query request can be any other URI. In a further embodiment, information associated with a previous query request of the client can be received along with the new query. In a further embodiment, the information comprises URI related information which is used for determining the search result of a previous query request. For example, in an HTTP GET mechanism, the URI related information could be the URI of the previous request; in an HTTP POST mechanism, the URI related information can be the URI and the request parameters of the previous query request. In yet another embodiment, the information further comprises an indicator uniquely corresponding to the previous query request. In yet another embodiment, the information comprises an indicator which can be an Etag value of the previous query result. In still another embodiment, the information comprises another indicator which indicates the second query result is available for the client. A detailed description is provided with reference to FIG. 8 below.

Next, the method 700 goes to step S703, in which the new query request can be executed, and the query result of the new query request can be retrieved. Then at step S705, the Etag value of the new query request can be determined based on the new query result. Then the method 700 can go to step S709, wherein the previous query can be executed. In a further embodiment, the URI related information of the previous query request can first be acquired from the new query request. Then, the previous query can be executed accordingly. There is also an optional step S707 prior to step S709, in which the Etag value of the new query request can be compared with the received Etag value, i.e. the Etag value of previous query request. In response to the compared result indicating the two Etag values are different, the method 700 can go to step S709. Then at step S711, the differences between the new query result and previous query result can be determined. In a further embodiment, the previous query result is as follows:

{"id": 1, "phone XS Max 64 GB": "A1920", "Color=Silver": "This is 64 GB model phone XS Max."},
{"id": 2, "phone XS 256 GB": "A2097", "Color=Gold": "This is 256 GB model phone XS."},
{"id": 3, "phone XS 256 GB": "A2098", "Color=Grey": "This is 256 GB model phone XS."}.

And the new query result is as follows:
{"id": 4, "phone XS 64 GB": "A2097", "Color=Gold": "This is 64 GB model phone XS."},
{"id": 2, "phone XS 256 GB": "A2097", "Color=Gold": "This is 256 GB model phone XS."},
{"id": 10, "phone X 64 GB": "A1865", "description": "This is 64 GB model phone X."},
{"id": 3, "phone XS 256 GB": "A2098", "Color=Grey": "This is 256 GB model phone XS."},
{"id": 5, "phone X 64 GB": "A1901", "description": "This is 64 GB model phone X."}.

It should be understood that the json data structure above is just for example, the data could be in other formats, such as html, xml, etc.

By comparing the previous query result with the new query result, the delta part of the data can be determined. In the example above, it can be found that the contents of id 2 and id 3 are duplicated, hence the contents of id 2 and id 3 can be determined to not be part of the delta. As such, the data of id 2 and id 3 do not need to be sent again. Then at step S713, only the delta part and an indicator of the duplicate data comprised in both the new query result and the previous query result are sent to the client. In the example above, the following data can be sent to the client:
{"id": 4, "phone XS 64 GB": "A2097", "Color=Gold": "This is 64 GB model phone XX."},
{"id": 2},
{"id": 10, "phone X 64 GB": "A1865", "description": "This is 64 GB model phone X."},
{"id": 3},
{"id": 5, "phone X 64 GB": "A1901", "description": "This is 64 GB model phone X."}.

As the query results are received in the browser, the data of id 2 and id 3 can be retrieved from the previous query result and inserted into the received query results, and the contents of the new query result can be generated as follows:
{"id": 4, "phone XS 64 GB": "A2097", "Color=Gold": "This is 64 GB model phone XX."},
{"id": 2, "phone XS 256 GB": "A2097", "Color=Gold": "This is 256 GB model phone XS."},
{"id": 10, "phone X 64 GB": "A1865", "description": "This is 64 GB model phone X."},
{"id": 3, "phone XS 256 GB": "A2098", "Color=Grey": "This is 256 GB model phone XS."},
{"id": 5, "phone X 64 GB": "A1901", "description": "This is 64 GB model phone X."}.

It should be noted that the data structures can be in other formats. In this manner, the duplicated data does not need to be resent, only the delta part would be sent, and bandwidth between the server and the client is saved accordingly.

Figure 8:
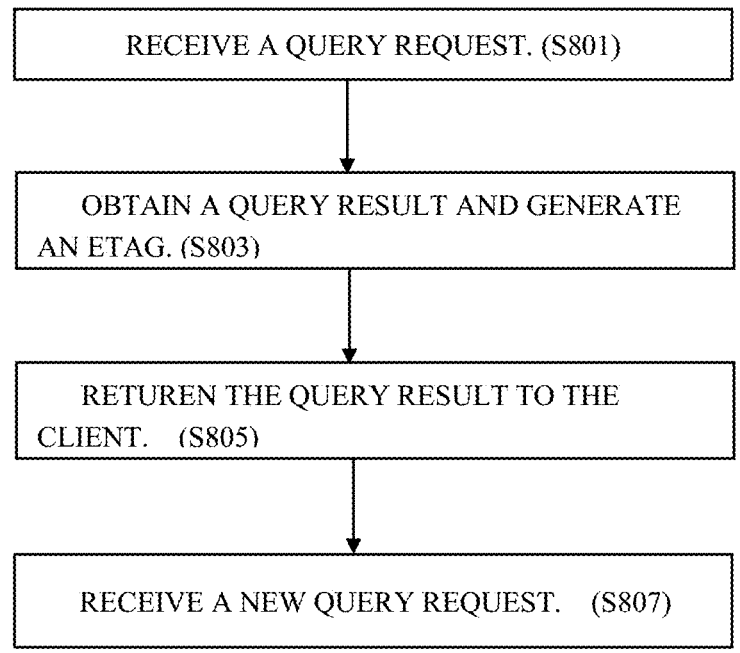
FIG. 8 depicts a flowchart of a method for processing a query, according to an embodiment of the present invention.

Turning now to FIG. 8, which shows a flowchart of a method 800 for processing the previous query request. The method starts at step S801, in which a query request, i.e. the previous query request, is received from the client. In a further embodiment, URI related information corresponding to the query request, for example, http://9.191.84.152/rest/goods/query?keyword=phone&price_between=2000, 3000&perpage=10, is received from the client. Then, the method 800 proceeds to step S803, in which a query result is obtained from the DB and an Etag value corresponding to the query result is calculated. In a further embodiment, after querying the DB, the server obtains the query result, for example, top 10 records, and determine an Etag value corresponding to the query result. In some embodiments, the Etag value is a hash value according to the query result.

Then at step 805, the server returns the query result to the client. In addition to the result, the server returns two other data items to client. The first data item is a calculated Etag value representing the query result and the second data item is the URI related information, i.e., prev_query value. In the above example, the prev_query value is http://9.191.84.152/rest/goods/query?keyword=phone&price_between=2000, 3000&perpage=10. In one embodiment, the Etag value and/or pre query value can be placed in HTTP Response Headers. In another embodiment, the Etag and/or pre_query value can be placed in cookies, or any other suitable location. In a further embodiment, the client can cache the query result, the Etag value and the pre_query value of the previous query. In some embodiments, the client can render the result on the user's browser. Then at step S807, the server receives a new query request along with the Etag value and the pre_query value in response to a new query request being submitted by the client. In a further embodiment, it would first be determined whether the local cached resource of the URI is expired (through the Cache-Control and the Expire headers). If the URI is not expired, the local cached resource can be retrieved. If the URI is expired, then the client can contact the server and send its previously saved copy of the ETag value and the pre_query value along with the new request.

Figure 9:
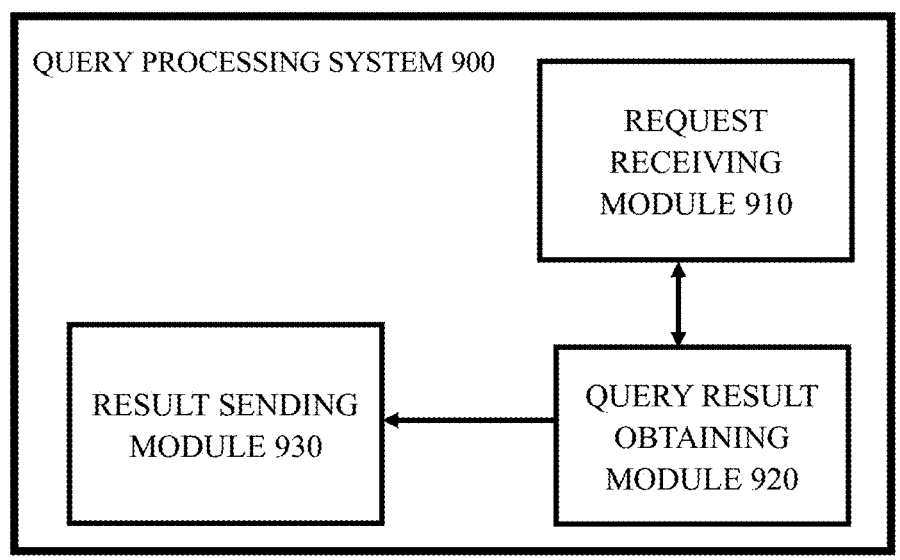
FIG. 9 depicts a diagram of a query processing system, according to an embodiment of the present invention.

It should be noted that the processing of queries according to embodiments of this disclosure can be implemented by a system 900 shown in FIG. 9. As FIG. 9 shows, the system 900 can comprise a request receiving module 910, a query result obtaining module 920, and a result sending module 930. The respective modules of the system 900 can be implemented by the computer system/server 12 in FIG. 1. In some embodiments, the request receiving module 910 receives one or more query requests from the client, and the query result obtaining module 920 obtains query results based on the information provided by the query request receiving module 910. The result sending module 930 sends a delta part of the data of the query result excluding the data comprised in both a current query result and a previous query result.

Figure 10B:
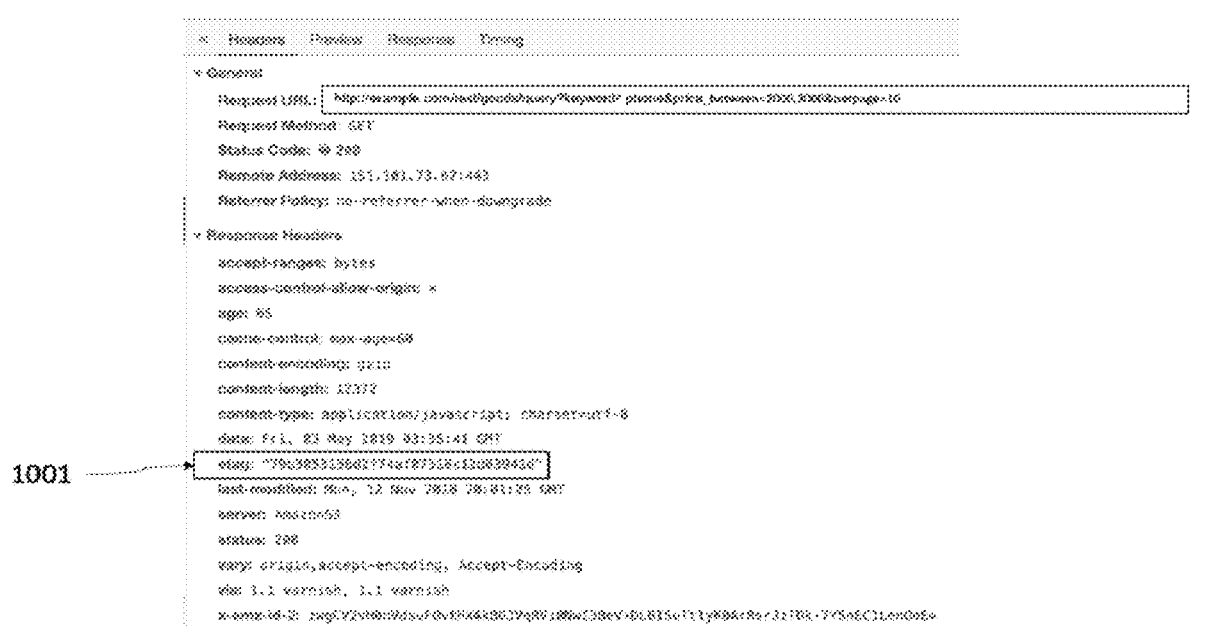

FIG. 10A-10D shows an example of a query result with an Etag value unmatched in accordance with embodiments of the present invention. For convenience of presentation, FIGS. 10A and 10B are the same as FIGS. 5A and 5B. Looking now to FIG. 10A, the URI in the first query can be http://example.com/rest/goods/query?keyword=phone&price_between=2000,3000&perpage=10 (not shown) and the search scope values $2000 and $3000 can be input. In response to the "Go" button being clicked, a first query request can be sent to the server. The server can then query the DB and can get query results from the DB. An Etag value can be calculated based on the query result. In some embodiments, the Etag value can be a hash value corresponding to the query result. The server can then send the query result to the client. In some embodiments, an HTTP Response, as shown in FIG. 10B, can be sent to the client. An Etag value "79b3053156d2f74af07518c12d03941d" (1001) corresponding to the query result can be put in the Headers and can be sent to the client with the query result. Accordingly, the first query request is finished.

Subsequently the user can submit a second query request. In an embodiment, the user can narrow the search scope to $2000-$2500. As such, in the second query request, the request URI can be http://example.com/rest/goods/query?keyword=phone&price_between=2000,2500&perpage=10. The search scope values are $2000 and $2500 as shown in FIG. 10C. In response to the "Go" button being clicked, the Etag value and URI related information of the first query are sent to the server with the second query request. In this embodiment, the URI related information is the URI itself. As shown in FIG. 10D, the Etag value "79b3053156d2f74af07518c12d03941d" (1002) is placed in the Headers and sent to the server. Then the second query is performed and the Etag value of second query result can be calculated. In a further embodiment, the Etag value of the second query request is "c855e8eb5fbdafddfa15bc848b662c44", which is different from the Etag value of first query request as the query results of two queries are different. In a further embodiment, the first query can be executed based on the URI related information. Then the delta part of the second query result and the first query result can be determined. The delta part of the search result can be sent to the client with the HTTP Response as shown in FIG. 10E. In some embodiments, the Etag value of second query request "c855e8eb5fbdafddfa15bc848b662c44" (1003) and the URI related information of this new query http://example.com/rest/goods/query?keyword=phone&price_between=2000, 2500&perpage=10 (1004) can be placed in the Headers, as shown in FIG. 10E. Accordingly, it is not necessary to send the entire contents of the second query result if the query result is not changed.

According to embodiments of the present invention, a computer program product of the present invention comprises a computer readable storage medium having program instructions embodied therewith, and the computer readable storage medium is not a transitory signal per se. The program instructions are readable by a device to cause the device to perform a method of the present invention.

According to embodiments of the present invention, A computer system of the present invention comprises one or more processors, a memory coupled to at least one of the processors, and a set of computer program instructions stored in the memory and executed by at least one of the processors to implement the methods of the present invention.

It should be noted that the processing of deduplicated data transmission according to embodiments of this disclosure can be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-OM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processing units, a query request from a client, wherein the query request comprises information of a previous query request from the client;
   retrieving, by the one or more processing units, a first query result of the query request and a second query result of the previous query request;
   sending, by the one or more processing units, a delta data and a first indicator to the client in response to the first query result being different from the second query result, wherein the delta data is a difference between a first data of the first query result and a second data of the second query result, and the first indicator indicates matching data comprised in both the first query result and the second query result; and
   embedding, by the one or more processing units, a Hypertext Transfer Protocol (HTTP) entity tag (Etag) value and the previous query request in a cookie associated with the client.

2. The method of claim 1, further comprising:
   comparing, by the one or more processing units, the first query result with the second query result to obtain the delta data.

3. The method of claim 1, wherein the information comprises URI related information of the previous query request.

4. The method of claim 3, wherein the information further comprises a specific data which corresponds uniquely to the second query result.

5. The method of claim 4, wherein the specific data comprises an Etag value of the second query result.

6. The method of claim 5, wherein the first query result of the query request and second query result of the previous query request further comprises:
   determining, by the one or more processing units, an Etag value of the first query result; and
   retrieving, by one or more processing units, the second query result of the previous query request based on the URI related information of the previous query request in response to the Etag value of the first query result being different from the Etag value of the second query result.

7. The method of claim 1, wherein the first query result and the second query result are structured data.

8. The method of claim 1, wherein the sending further comprises a second indicator which indicates the second query result is available for the client.

9. A computer system, comprising:
a processor;
a computer-readable memory coupled to the processor, the memory comprising instructions that when executed by the processor perform actions of:
receiving a query request from a client, wherein the query request comprises information of a previous query request of the client;
retrieving a first query result of the query request and a second query result of the previous query request;
sending a delta data and a first indicator to the client in response to the first query result being different from the second query result, wherein the delta data is a difference between a first data of the first query result and a second data of the second query result, and the first indicator indicates matching data comprised in both the first query result and the second query result; and
embedding, by the one or more processing units, a Hypertext Transfer Protocol (HTTP) entity tag (Etag) value and the previous query request in a cookie associated with the client.

10. The system of claim 9, wherein the actions further comprise:
comparing the first query result with the second query result to obtain the delta data.

11. The system of claim 9, wherein the information comprises URI related information of the previous query request.

12. The system of claim 11, wherein the information further comprises a specific data which corresponds uniquely to the second query result.

13. The system of claim 12, wherein the data comprises an Etag value of the second query result.

14. The system of claim 13, wherein the retrieving first query result of the query request and second query result of the previous query request further comprises:
determining an Etag value of the first query result; and
retrieving the second query result of the previous query request based on the URI related information of the previous query request in response to the Etag value of the first query result being different from the Etag value of the second query result.

15. The system of claim 9, wherein the first query result and the second query result are structured data.

16. The system of claim 9, wherein the sending further comprises a second indicator which indicates the second query result is available for the client.

17. A computer program product comprising a computer readable storage medium having a computer readable program stored therein, wherein the computer readable program, when executed on a computing device, causes the computing device to:
receive a query request from a client, wherein the query request comprises information of a previous query request of the client;
retrieve a first query result of the query request and a second query result of the previous query request;
send a delta data and a first indicator to the client in response to the first query result being different from the second query result, wherein the delta data is a difference between a first data of the first query result and a second data of the second query result, and the first indicator indicates matching data comprised in both the first query result and the second query result; and
embedding, by the one or more processing units, a Hypertext Transfer Protocol (HTTP) entity tag (Etag) value and the previous query request in a cookie associated with the client.

18. The computer program product of claim 17, wherein the information comprises URI related information of the previous query request.

19. The computer program product of claim 17, wherein the information further comprises a specific data which corresponds uniquely to the second query result, and the data comprises an Etag value of the second query result.

20. The computer program product of claim 19, wherein the first query result of the query request and second query result of the previous query request further causes the computing device to:
determine an Etag value of the first query result; and
retrieve the second query result of the previous query request based on the URI related information of the previous query request in response to the Etag value of the first query result being different from the Etag value of the second query result.

* * * * *